Nov. 16, 1965  G. W. BECK ETAL  3,217,506
ICE MAKER WITH BIN ACTUATED CONTROL MEANS
Original Filed Oct. 23, 1962  7 Sheets-Sheet 1

INVENTORS
George W. Beck
Walter G. Kniffin
Benny M. Hillberry
BY
Carl A. Stickel
THEIR ATTORNEY INVENTORS
George W. Beck
Walter G. Kniffin
Benny M. Hillberry
BY Carl A. Stickel
THEIR ATTORNEY

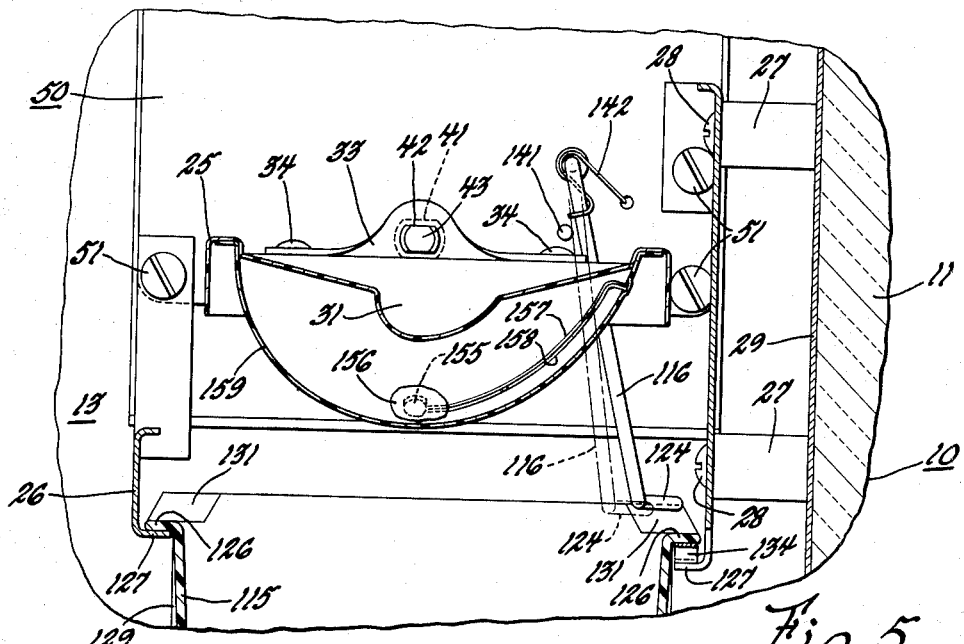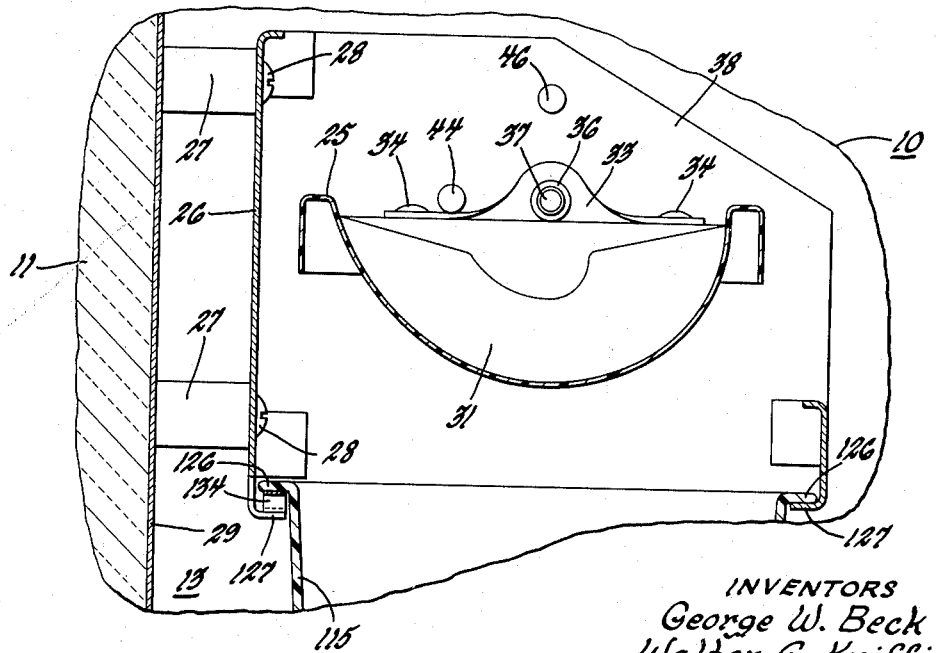

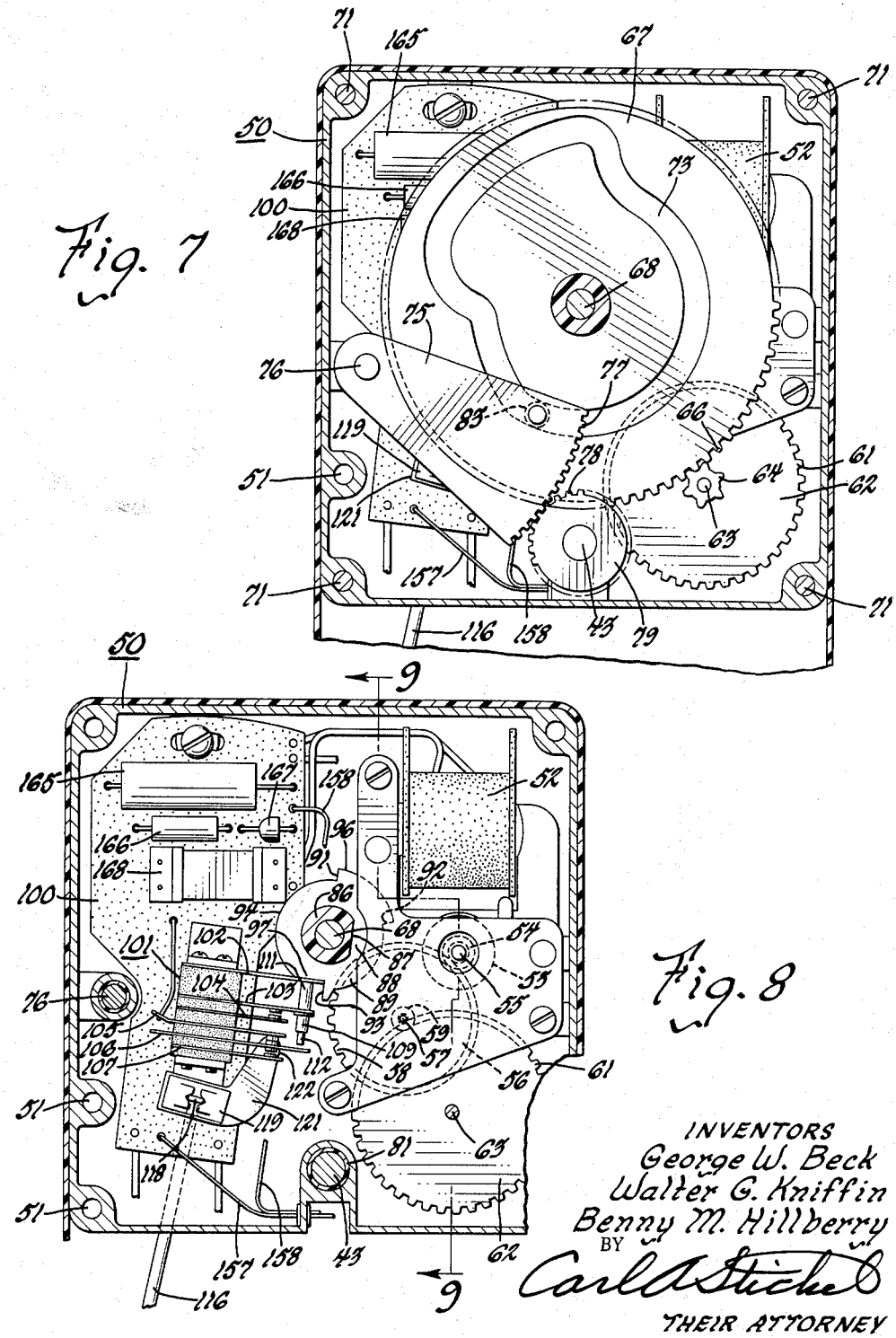

Nov. 16, 1965   G. W. BECK ETAL   3,217,506
ICE MAKER WITH BIN ACTUATED CONTROL MEANS
Original Filed Oct. 23, 1962   7 Sheets-Sheet 6

INVENTORS
George W. Beck
Walter G. Kniffin
Benny M. Hillberry
BY
THEIR ATTORNEY

Nov. 16, 1965 G. W. BECK ETAL 3,217,506
ICE MAKER WITH BIN ACTUATED CONTROL MEANS
Original Filed Oct. 23, 1962 7 Sheets-Sheet 7
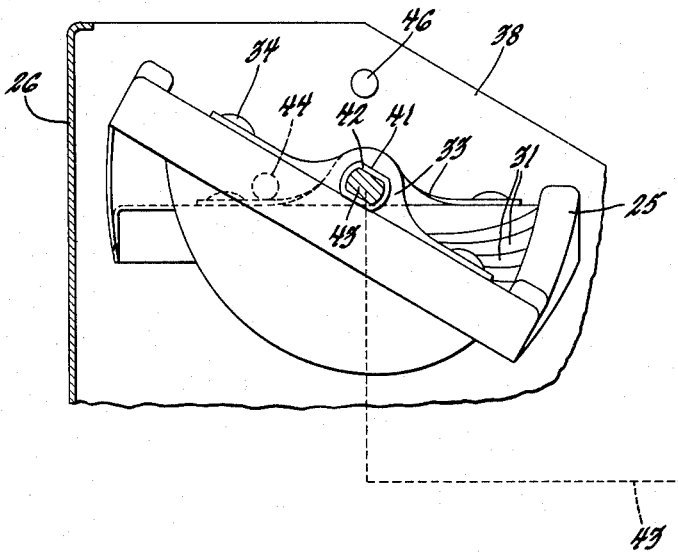
Fig. 12
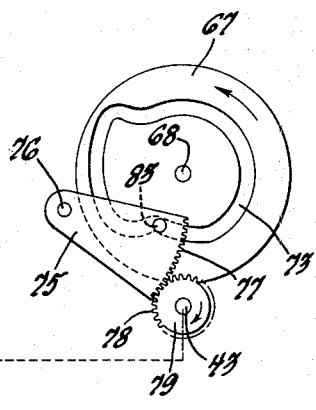
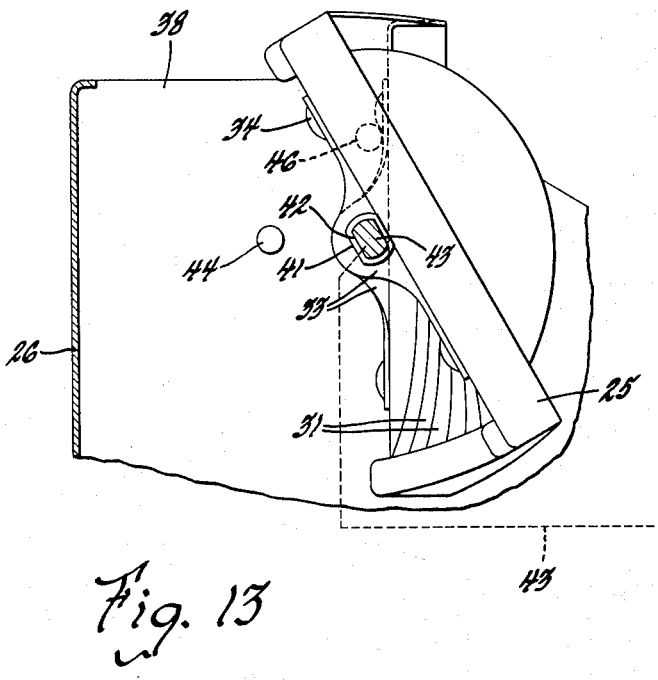
Fig. 13
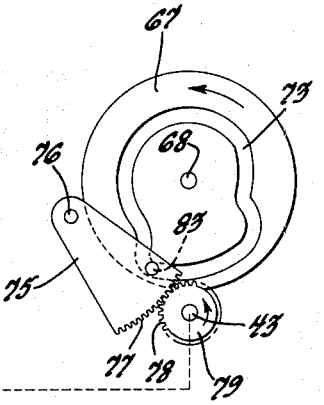
INVENTORS
George W. Beck
Walter G. Kniffin
Benny M. Hillberry
BY
Carl A. Stichel
THEIR ATTORNEY

United States Patent Office 3,217,506
Patented Nov. 16, 1965

3,217,506
ICE MAKER WITH BIN ACTUATED CONTROL MEANS
George W. Beck and Walter G. Kniffin, Dayton, Ohio, and Benny M. Hillberry, Ames, Iowa, assignors to General Motors Corporation, Detroit, Mich., a corporation of Delaware
Original application Oct. 23, 1962, Ser. No. 232,355. Divided and this application Mar. 18, 1965, Ser. No. 440,718
6 Claims. (Cl. 62—137)

This application is a division of our co-pending application S.N. 232,355 filed October 23, 1962.

This invention relates to refrigeration and more particularly to a machine or apparatus for automatically making ice blocks and ejecting the blocks therefrom into a storage receptacle from which may be harvested.

We are aware of the fact that others have constructed ice block making apparatuses for use in mechanically refrigerated household refrigerator cabinets but to date such apparatuses have been so expensive that an ordinary purchaser of a household refrigerator has been discouraged from paying the additional cost of an apparatus of this type therein and has therefore been deprived of the advantages thereof. Most of these apparatuses have employed artificial heat in ejecting ice blocks from their freezing mold or tray and this, in addition to increasing the cost of operating a refrigerator equipped with same, also decreases the efficiency of the refrigerating system due to dissipation of heat into the freezing chamber. We contemplate an ice block making apparatus for installation in a freezing chamber of a refrigerator cabinet which is practical, of low cost to operate and of such small retail price as to enhance the desirability of the public to purchase a household refrigerator cabinet furnished with an automatic ice maker.

An object of our invention is to provide a low cost reliable ice block making apparatus for installation in a household refrigerator cabinet which apparatus is positive in operation and from which ice blocks are ejected in a dry state into a storage or harvesting receptacle removably located in the cabinet.

Another object of our invention is to provide an ice block making apparatus with a mold or tray that is rotatable and twistable for ejecting ice blocks therefrom and wherein warpage of the mold or tray due to its twisting is removed before the tray is rotated into a position to receive water therein for increasing the practicability and longevity of this portion of the apparatus to insure proper operation thereof.

Another object of our invention is to provide a unique arrangement in an automatic ice block making apparatus for converting revolutions of a unidirectional electric motor into opposite rotary movements of a twistable ice mold or tray thereof to initially twist the tray in a first direction and to reversely twist same in a second direction.

A further object of our invention is to provide an automatically operated ice block making apparatus with a thermally responsive means devoid of actuatable or movable elements which is shielded from temperatures in the vicinity of the freezing device portion thereof to detect the freezing solid of ice blocks therein and which means is rendered effective only thereby for initiating an ice block ejecting cycle of the apparatus.

A still further and more specific object of our invention is to provide an automatic ice making apparatus having an upright elongated twistable ice block tray mounted in a freezing chamber for rotation therein with mechanical or cam means interposed between a unidirection motor and one end of the tray which changes 360° revolutions of the motor into opposite rotary driving movements of one end of the tray to cause the other end thereof to engage stationary stops thereat for effecting a double or reverse twist of the tray before same is returned to its upright position.

Further objects and advantages of the present invention will be apparent from the following description, reference being had to the accompanying drawings wherein preferred embodiments of the present invention are clearly shown.

In the drawings:

FIGURE 5 is a fragmentary sectional view of the freezing device and ice block storage receptacle portions of the ice making apparatus and is taken on the line 5—5 of FIGURE 3 in a direction toward the front of the freezing chamber;

FIGURE 6 is a view similar to FIGURE 5 taken on the line 6—6 of FIGURE 4 in a direction toward the rear of the freezing chamber showing an abutment and a stop to be engaged by the tray of the ice maker;

FIGURE 7 is a vertical sectional view taken on the line 7—7 of FIGURE 4 through a mechanism housing of the apparatus showing a motion converting means therein;

FIGURE 8 is a view similar to FIGURE 7 taken on the line 8—8 of FIGURE 4 showing a switch and other electrical elements of the ice making apparatus housed in the mechanism housing;

FIGURE 12 is a schematic view illustrating an initial rotation and twist of the ice freezing tray of the apparatus in one direction;

FIGURE 13 is a view similar to FIGURE 12 illustrating rotation and twisting of the ice freezing tray in another direction.

While the general principle of twisting a flexible or resilient ice block freezing device, mold or tray, for loosening ice blocks therein from walls thereof has been known for some time by those familiar with the art and any warpage of the mold or tray incurred by its twisting was manually removed therefrom prior to refilling the mold or tray with water. This twist principle was carried over into automatic ice machines or apparatuses by others and it has presented a problem therein which has not as yet been fully overcome. For example, in an ice making machine utilizing a rotatable and twistable tray the warpage imparted thereto by its distortion must be entirely removed therefrom prior to returning the tray to an upright water filling position. If such is not done the tray will take on a permanent set whereby end portions thereof are out of horizontal alignment with one another when the tray is uprighted and it cannot be filled to a uniform level along its length. A nonuniform upper surface of ice blocks in the tray during continued operation of the machine or apparatus to eject the blocks may cause an ice block or blocks to remain in pockets or compartments of the tray thus resulting in overflow thereof by water at a subsequent refilling of the tray therewith. Furthermore, in former ice making machines or apparatuses known to us utilizing a rotatable twistable water freezing tray a costly reversible motor and reversing switch or a reciprocating ice motor which must be heated has been employed to twist the tray in opposite directions. The last phase of operation of the motor in a reverse direction to return the tray against a stop in an upright position has been relied upon to remove warpage of the tray, and in many instances the motor becomes deenergized prior to removal of tray warpage. Accordingly, our invention is to be distinguished from former ice making machines or apparatuses employing such power elements.

Figure 2:
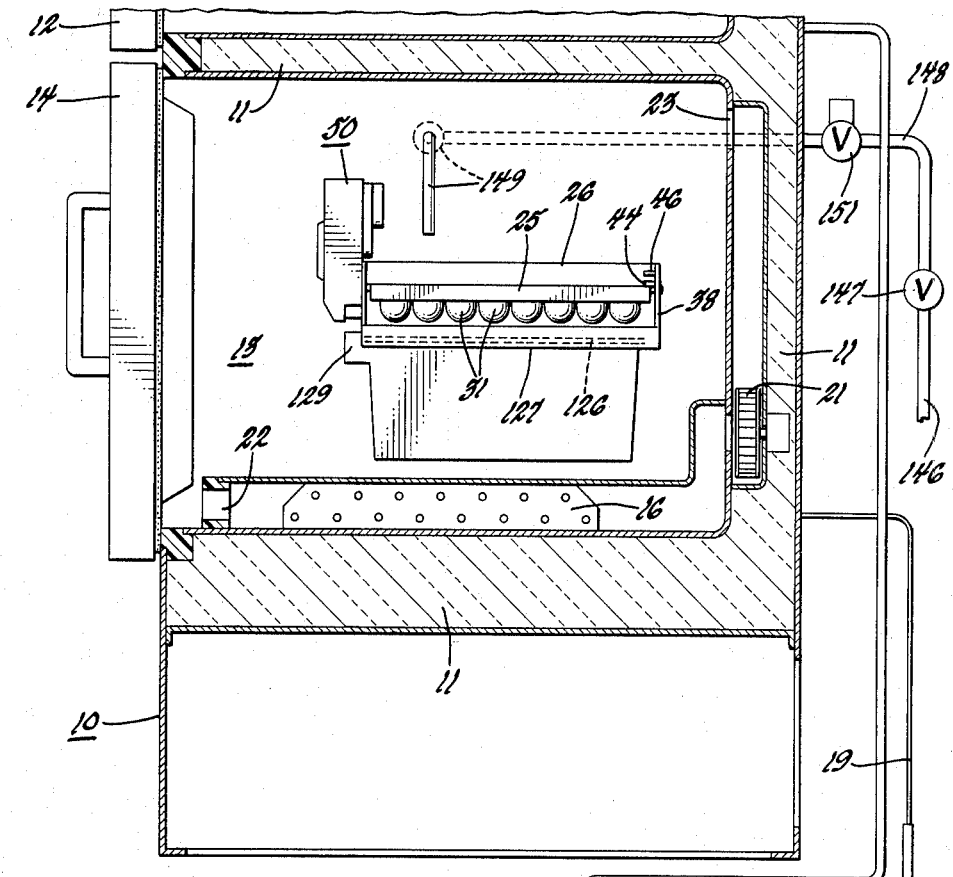
FIGURE 2 is an enlarged fragmentary vertical sectional view through the freezing chamber portion of the refrigerator cabinet taken on the line 2—2 of FIGURE 1 and illustrating a pipe connection to the cabinet for supplying water to the ice making apparatus.
Figure 1:
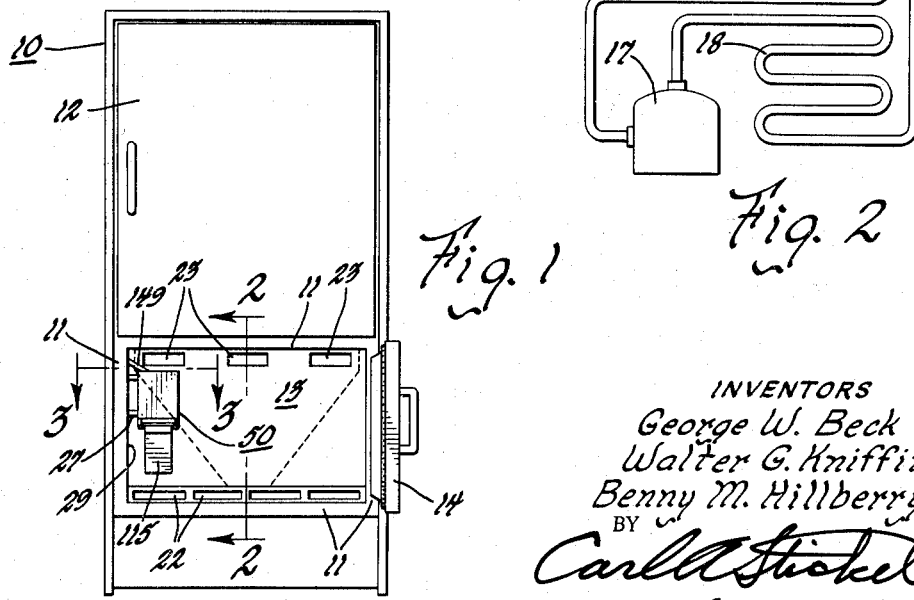
FIGURE 1 is a front view of a multichambered household refrigerator cabinet showing the door to the freezing chamber thereof in open position to illustrate an ice block making apparatus of our invention mounted therein.

Referring now to the drawings, an ice making apparatus as herein disclosed is preferably mounted in the freezing or frozen food storage chamber of a household refrigerator cabinet of the "no frost" or "frost free" type wherein air in the chamber is circulated therefrom across an evaporator, of a refrigerating system associated with the refrigerator by an air moving means, chilled to a low temperature and then forced in somewhat of a concentrated stream back into the chamber over at least the water freezing device of the ice maker. We show in FIGURE 1 of the drawings a household refrigerator cabinet 10 having a plurality of insulated walls 11 (see FIGURE 2) providing an unfrozen food storage chamber in the upper part of the cabinet, closed by a door 12, and a freezing or frozen food storage chamber 13 in the lower part of the cabinet normally closed by a door 14, illustrated in open position to show our ice making apparatus located therein. A detailed description of a refrigerator and a refrigerating system associated therewith of the character described is unnecessary herein since such is now on the market and is preferably of the type disclosed in the L. J. Mann Patent No. 2,912,834 dated November 17, 1959. This patent is made of reference as exemplifying a more specific or full disclosure of the type of refrigerating apparatus and control thereof associated with refrigerator 10. The refrigerating system allied with cabinet 10 includes a plate-type refrigerant evaporator (not shown) for cooling the interior of the upper chamber closed by door 12, a finned tube type evaporator 16 mounted beneath a false bottom of lower chamber 13 (see FIGURE 2), a motor-compressor containing casing 17, a refrigerant condenser 18, a refrigerant restrictive capillary tube 19 connected to evaporator 16 and suitable pipes or conduits connecting these elements of the system in closed refrigerant flow relationship. Evaporator 16 maintains all of the interior of chamber 13 at a temperature below 32° F. and preferably in the neighborhood of 10° to 15° F. An air moving means in the form of a motor driven fan or blower 21 circulates air out of or away from chamber 13 through inlet openings 22 across evaporator 16, to chill the air to a predetermined temperature lower than the below 32° F. temperature in the chamber, say for example at 5° F., and discharges a stream or streams of this very low temperatured chilled air back into chamber 13 through each of a plurality of outlets 23 over the freezing device portion or ice mold of the ice making apparatus located in this chamber.

*Ice making apparatus*

Figure 3:
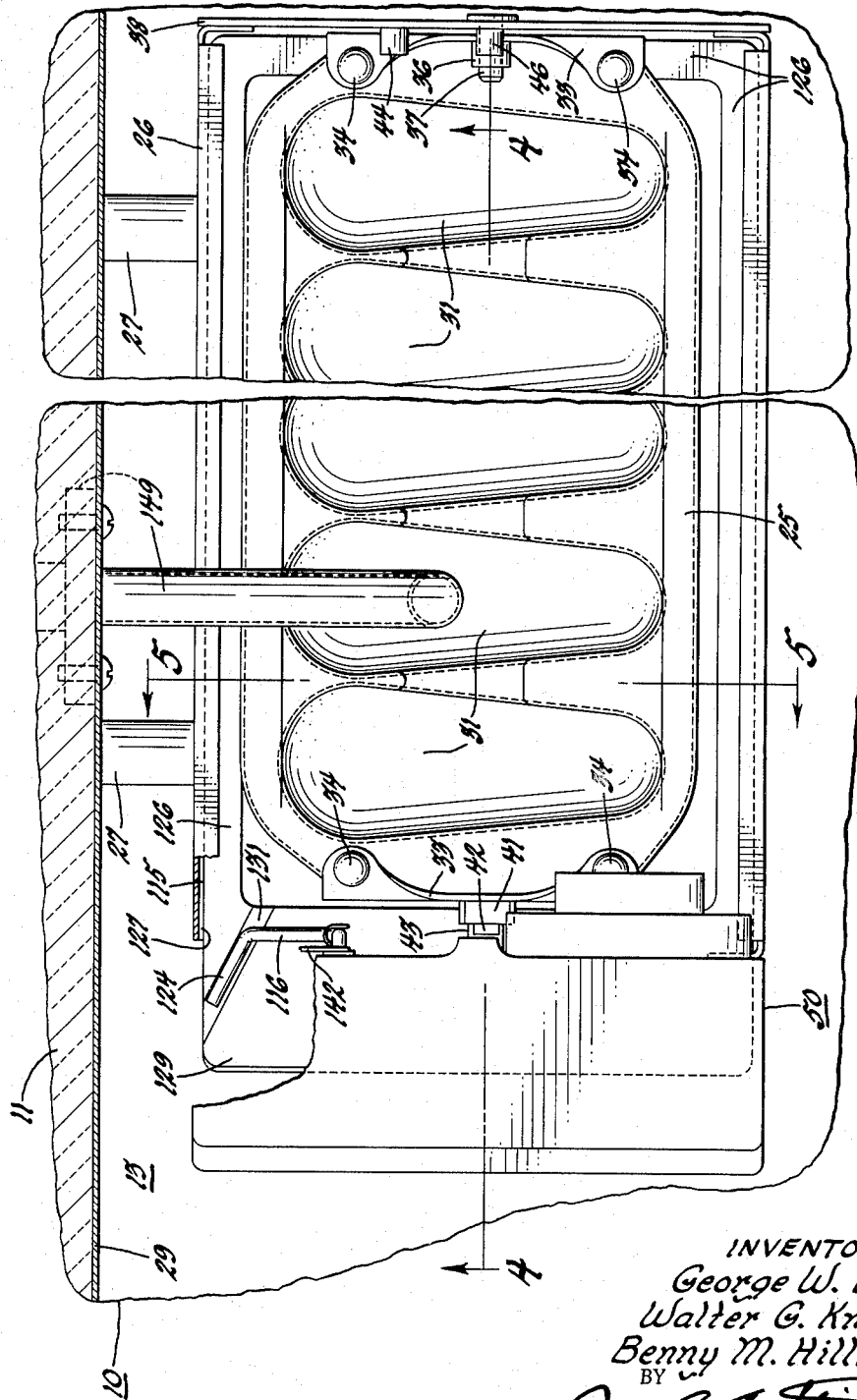
FIGURE 3 is a fragmentary enlarged broken horizontal sectional view taken on the line 3—3 of FIGURE 1 showing the top of the ice making apparatus with a portion thereof broken away to illustrate a part of the apparatus cut-off mechanism.

The ice making apparatus disposed in chamber 13 of refrigerator 10 includes an elongated resilient twistable freezing device, mold or tray 25 located in an upright position within the chamber and supported at its ends for rotation therein on a bracket 26 secured by spacers 27 and screws 28 (see FIGURES 3, 4, 5 and 6) to the vertical side wall 29 of chamber 13. Tray or mold 25 is provided with walls dividing the interior thereof into a row of pockets or compartments 31 adapted to receive water to be frozen into ice blocks within chamber 13. The tray 25 is formed of any suitable material and preferably of polyethylene of such density as to be self-sustaining or nonsaggable intermediate its ends when pockets or compartments 31 thereof are substantially filled with water. The general configuration of tray 25 and the shape of walls of pockets or compartments 31 therein are preferably as more fully illustrated and described in the copending application of Walter G. Kniffin, S.N. 136,459 filed September 7, 1961, entitled "Freezing Device" now Patent No. 3,075,364 dated January 29, 1963, and assigned to the assignee of this application. Metal cleats 33 are secured by rivets or the like 34 to ends of tray or mold 25. The cleat 33 at the rear end of tray 25 is provided with a round pivotal mounting portion 36 which fits over or surrounds a rounded stud or pin 37 secured to one end 38 of the bracket 26 (see FIGURES 3, 4 and 6). The cleat 33 at the front end of tray 25 is provided with a squared or flattened mounting portion 41 which fits over or surrounds a squared or flattened part 42 of a drive stud or shaft 43 to be hereinafter described (see FIGURES 3, 4 and 5). It is to be understood that the front end and the rear end of mold or tray 25 as referred to is to be considered the end thereof located closest to door 14 of chamber 13 and the end closest to the back wall of this chamber respectively. An abutment in the form of a stud 44 and a stop in the form of a stud 46 are each rigidly or stationarily mounted to rear end plate 38 of bracket 26 (see FIGURES 3, 6, 12 and 13) and at arcuately spaced-apart points about the horizontal axis of rotation of tray 25 in the path of opposite rotary movements thereof and are to be engaged by rear end positions of the tray by the metal cleat 33 thereat to limit the amplitude of rotation of this end of the tray as will be hereinafter described.

Figure 9:
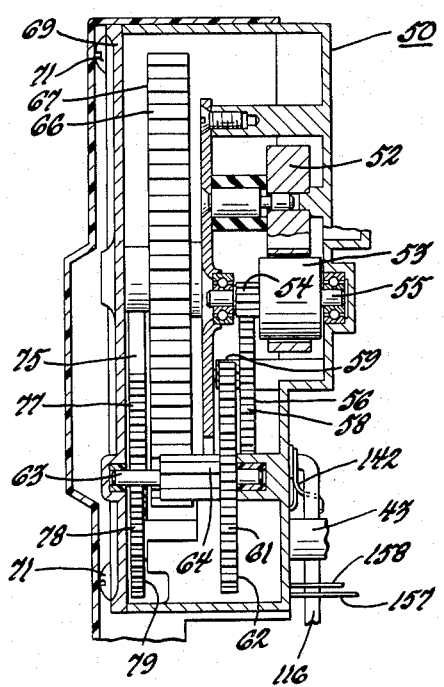
FIGURE 9 is a vertical sectional view through the mechanism contained in the housing of the apparatus taken on the line 9—9 of FIGURE 8 showing another portion of the motion converting means and a gear train for operating same.

A mechanism for rotating tray 25 in a first direction and thence in a second direction wholly within a 360° arc to effect an initial slight twist and at least an equal or greater reverse twist of the tray and electrically energizable means for controlling the mechanism to fill tray 25 with water to be frozen therein is provided. This mechanism includes a mechanical motion converting means and a so-called stacked electric switch associated therewith located in a housing generally represented at 50 which is rigidly mounted upon the front end portion of bracket 26 by screws or the like 51 (see FIGURES 4, 5, 7 and 8). Housing 50 contains a small unidirectional electric motor including a stator 52 and a rotor 53 (see FIGURES 8 and 9) having a small gear 54 keyed, in any suitable or conventional manner, to its shaft 55. A gear 56 rotatably mounted on a shaft 57 has teeth 58 formed on its periphery meshing with the teeth on gear 54 and is provided with a small hub portion provided with gear teeth 59. The teeth 59 mesh with teeth 61 on a gear 62 rotatably about a shaft 63. Gear 62 is provided with a hub portion (see FIGURES 7 and 9) having teeth 64 formed thereon. Teeth 64 on gear 62 mesh with teeth 66 provided on the periphery of a molded plastic disk-like member 67 rotatably mounted in housing 50 on a shaft 68 having one of its ends journaled in a bearing thereof and its other end journaled in another bearing formed in front closure plate 69 for the housing which is secured thereto by screws 71 (see FIGURES 4, 7 and 8). A molded plastic or the like decorative cover may be removably attached to housing 50 for substantially enclosing same. A gear train as disclosed is conventional, well known to those skilled in the art and therefore needs no further structural description herein.

Referring now to FIGURES 4, 7, 12 and 13 of the drawings, it will be noted that a cam means or continuous cam groove or race 73 is provided in one face of wheel or disklike member 67. The cam groove or race 73 forms with other elements to be described a motion transmitting and converting means in the present apparatus for changing 360° revolutions of rotor 53 of the unidirectional electric motor into opposite rotary movements of the freezing mold or tray 25 whereby a double or reverse twisting thereof is obtained to obviate the necessity of employing more costly means to effect same. A gear segment 75 (see FIGURE 7) is pivotally mounted within housing 50 on a pin or stud 76 and is provided with teeth 77 which mesh with teeth 78 on a gear 79 formed on the shaft 43 within a bearing 81 of the housing for driving the freezing device or tray component 25 of the ice making apparatus (see FIGURES 4, 8, 12 and 13). The gear segment 75 has a cam follower stud or roller 83 secured thereto and disposed within groove or race 73 for reciprocating the gear segment in accordance with differentially curved or lobe portions of the cam race upon rotation of member 67 by the motor rotor 53 through the train of gears described.

Figure 4:
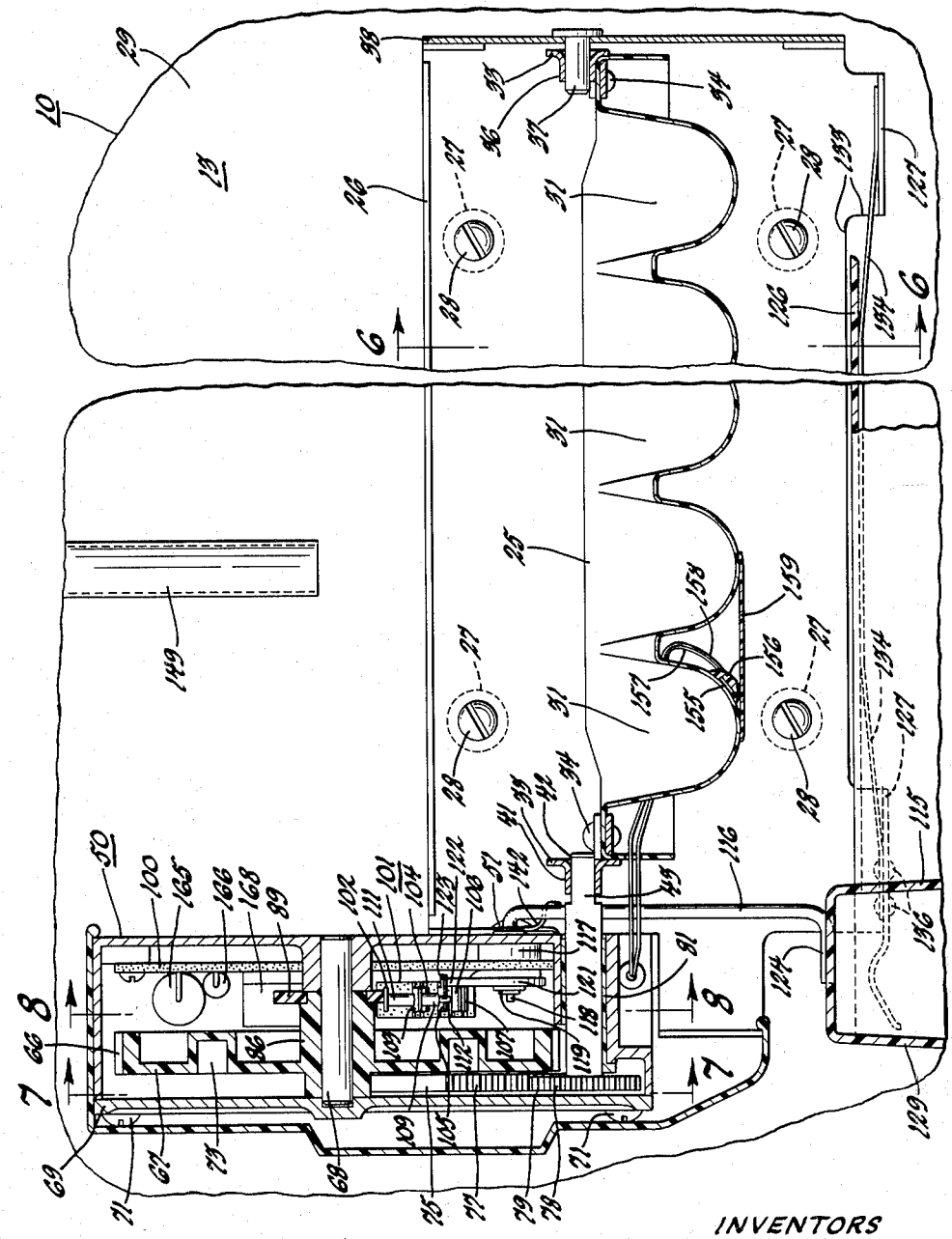
FIGURE 4 is a fragmentary broken sectional view of the ice making apparatus taken on the line 4—4 of FIGURE 3.

Referring further to FIGURES 4 and 8 of the drawings, it is to be noted that the one end portion of hub 86 on cam wheel member 67 is cut out as at 87 to provide a flat key portion (see FIGURE 8) which receives a flat portion 88 of an opening in a multishouldered disk 89 located between hub 86 and the bearing for shaft 68 in housing 50 for locking the disk 89 onto this wheel member to be rotated therewith. Disk 89 is provided with three circumferentially spaced-apart outwardly projecting shoulders 91, 92 and 93 thereon about the periphery thereof. It will be noted that a peripheral edge 96 on disk 89 is continuous intermediate shoulders 91 and 92 and projects outwardly beyond or is of a greater diameter than a peripheral edge 94 on the disk, between shoulders 91 and 93, for a purpose to be hereinafter described with respect to an electric stack switch incorporated in housing 50. A portion of the smaller diametered peripheral edge 94 of disk 89 adjacent shoulder 93 is undercut, below edge 94, and flattened as at 97 for a purpose to be hereinafter described. An insulator board 100 having a printed electric circuit provided on one side thereof, in a conventional fashion now well known to those skilled in the art, is adjustably mounted or secured within housing 50 and carries on its opposite side, in addition to certain elements of an electric system for the ice making apparatus, a stack switch generally represented at 101 comprised of several sub-switches. Switch 101 includes a plurality of spaced-apart spring arms or blades suitably insulated from one another and some of which are conductors of electric current. For example, switch 101 is provided with spring arms 102, 103, 104, 105, 106 and 107 (see FIGURE 8) with the arms 103 and 104 each carrying a mating contact adapted to engage one another and with the arm 106 carrying a contact on each opposite side thereof adapted to alternatively engage a contact on arm 105 and a contact on arm 107. Spring arms 102, 103 and 106 extends beyond ends of arms 104, 105 and 107 and the extension on arm 103 has an insulator pin 109 mounted thereon and projecting therethrough to either side thereof with its one end 111 abutting against arm 102. The other end 112 of pin 109 is normally spaced from spring arm 106 but is adapted to engage this arm and shift the contact on the upper side thereof away from the contact on arm 105 and for shifting the contact on the lower side thereof into engagement with the contact on the lower side thereof into engagement with the contact on arm 107. The end of arm extension 102 rests against the undercut flat portion 97 of rotatable disk 89 while normally maintaining contacts on arms 103 and 104 separated or opened and to permit the spring tension of arm 106 to bias the contact thereon closed against the contact on arm 105 for the purpose of keeping an electrical circuit of the ice making apparatuses activated.

Figure 10:
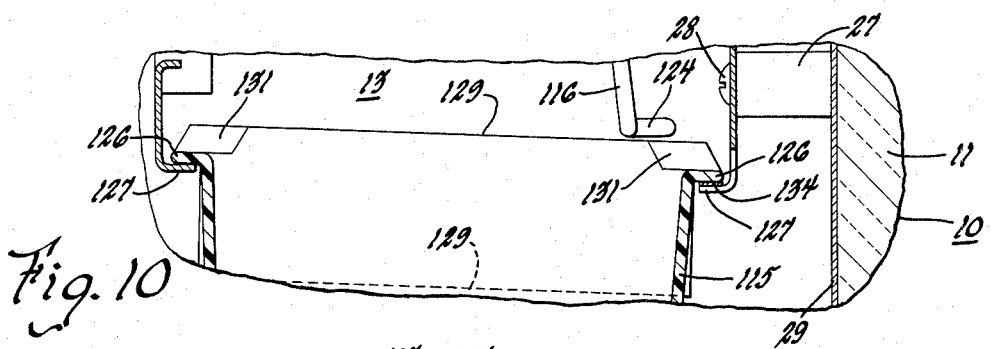
FIGURE 10 is a fragmentary view illustrating a lower shifted position of the ice storage receptacle when substantially filled with ice blocks for terminating production of ice blocks by the ice maker.

Deactivation of the electric circuit of the ice making apparatus is of course desired to stop production of ice blocks thereby after a predetermined accumulation thereof in the refrigerator cabinet 10 and/or when an ice block storage and serving receptacle associated with the apparatus is removed from freezing chamber 13. For this purpose we provide an arrangement for terminating the production of ice blocks which includes a means cooperating with a sub-switch of stack switch 101 and with an ice block storage receptacle 115 removably supported or located beneath the ice maker in chamber 13 (see FIGURES 1 and 2). The terminating or cut-off means comprises a heavy round wire or bar 116 which has a hook end portion pivotally anchored in a hole provided in a bearing 117 (see FIGURE 4) of housing 50 with an inward extension of the bar flattened as at 118 and secured within the housing by a suitable clamping or locking spring nut 119 (see FIGURE 8). A flat lever 121 has its one end keyed to the flattened part 118 of wire or bar 116 in back of nut 119 and its other end 122 (see FIGURE 8) is adapted to engage an ear 123 (see FIGURE 4) formed integral on and extending laterally from arm 105 of electric switch 101. The lower end portion of wire or bar 116 depends into association with the ice storage receptacle 115 and is bent angularly as at 124 (see FIGURES 4, 5 and 10) so as to rock or swing the bar about its pivotal anchorage for shifting lever 121 to cause the end 122 thereof to raise the contact on switch arm 105 upwardly out of engagement with the contact on arm 106 of switch 101 in response to movements of the storage receptacle. Upstanding walls of box-like ice block storage receptacle, bin, or bucket 115 has the top of its two long sides and its rear end flanged outwardly as at 126 and is supported on inwardly flanged parts 127 of side portions of bracket 26. The upstanding front end of receptacle 115 is provided with a handle portion 129 (see FIGURES 3, 4, 5 and 10) the upper surface of which is raised above the flange portions 126 and has an upwardly inclined shoulder 131 disposed at an angle substantially corresponding to the angular disposition of the lower end part 124 of bar or wire 116 for cooperation therewith adjacent a front corner of the ice block receptacle. Flange part 127 of bracket 26 on the side thereof farthest away from side wall 29 of freezing chamber 13 is preferably continuous throughout the length of the bracket. The flange part 127 of bracket 26 on the side thereof nearest side wall 29 is cut away as at 133 (see FIGURE 4) intermediate ends thereof and a long narrow normally upwardly bowed spring 134 spans the separated or spaced-apart portions of flange 127 at this side of the bracket. One end of spring 134 is secured by rivets or the like 136 to the front spaced portion of flange 127 and the other end thereof slidably bears against the spaced rear portion of flange 127. The bowed spring 134 receives thereon one outwardly flanged side 126 of receptacle 115 and normally supports that side of the receptacle thereat elevated above its other side as best seen in FIGURES 4, 5 and 6 of the drawings. In this normal position of receptacle 115 the lower angular part 124 of rotatable or swingable bar 116 mates with and bears against the upwardly inclined shoulder 131 on the front of the receptacle (see FIGURE 5) for holding the end 122 of lever 121 in engagement with the under face of ear 123 on arm 105 of switch 101 so as to ready lever 121 capable of moving the contact on arm 105 away from the contact on switch arm 106. When receptacle 115 is shifted, relative to its support or flanges 127, as will be more fully described hereinafter, lower end 124 of bar 116 is freed from shoulder 131 and the bar swings abouts its pivotal mounting against a stop pin 141 on the back of housing 50 unde the influence of a hairpin or the like spring 142 into the position shown in dot-dash lines in FIGURE 5 or the full line position thereof as illustrated in FIGURE 10. Rotation of the pivotally mounted portion of bar 116 in a counterclockwise direction, as viewed in FIGURE 8 of the drawings, after being freed from receptacle 115, renders spring 142 effective to overcome the spring tension of spring arm 105 on switch 101 and the end 122 of lever 121 separates the contact on arm 105 from the contact on switch arm 106 to deactivate an electric circuit of the ice making apparatus.

*Water supply*

We provide the ice maker with means for automatically filling the tray with water to be frozen into ice blocks in pockets or compartments thereof within freezing chamber 13. This means includes, in addition to a sub-switch portion of switch 101, a pipe 146 (see FIGURE 2), having a manually actuated shut-off valve 147 therein, which is connected to a source of water supply under pressure. Another pipe 148 extends from valve 147 through an insulated wall of chamber 13 of cabinet 10 and is provided with a nonmetallic molded plastic portion 149 having its outlet end disposed above tray 25 out of the path of rotation thereof. Outlet end of water tube or pipe 149 is positioned arcuately with respect to the axis of tray 25 within an arc between a 30° clockwise initial twist of the tray and a 30° reverse or counterclockwise twist thereof after the tray is rotated from a horizontal position into a substantially vertical position. A solenoid actuated valve 151, included in the electrical system of the apparatus, is interposed in pipe 148 between outlet end 149 thereof and valve 147 for admitting water into tray 25. In the present disclosure disk 89, rotated with the cam means or wheel member 67, and the cooperation thereof with a sub-switch part of electric switch 101, is the control for water valve 151 and this control is coordinated with elements of the electric system of the apparatus so as to open and/or close the valve in a manner to be hereinafter described.

*Tray rotation control*

Rotation of tray 25 in the present apparatus is initiated by a temperature responsive means which is protected from temperature differentials in the vicinity of the tray and is thereby rendered capable of accurately sensing the exact temperature of solidly frozen ice within tray 25. We employ a thermistor 155 to detect solid ice in tray 25 and this thermistor is sealed in intimate heat exchange relationship with a wall of a compartment 31 of the tray by any suitable or desirable nonmetallic substance 156 (see FIGURES 4 and 5) so as to be rotatable with the tray. The thermistor 155 is preferably located intermediate two adjacent compartments 31 of tray 25 and has insulated wires 157 and 158 extending therefrom to terminals on the printed circuit board 100. Thermistor 155 is shielded in its mounted location by a molded plastic shield or cover 159 sealed or cemented to portions of tray 25 so as to enclose same in an isolated hollow pocket or a dead air space adjacent the tray whereby the function of the thermistor will not be affected by blasts of the cold 5° F. temperatured air circulated into chamber 13 over the ice block maker. A thermistor is a semiocnductor of electric current that has a high negative temperature coefficient of resistance and thus is extremely sensitive to relatively small temperature variations. It is a variable resistor controlled by environmental temperature changes and is comprised of elements immovable with respect to one another, the condition of which are altered by the temperature changes. In other words, when a thermistor is subjected to rising temperatures, its resistance to flow of electric current therethrough decreases with the increase in temperature and, likewise, when subjected to lowering temperatures, there is an increase in thermistor resistance. Such thermistors are now conventional, well known to those skilled in the art, and the thermistor 155 herein employed may be a small disk or a bead of the type disclosed in the patent to M. J. Lawrence No. 2,928,037 dated March 8, 1960.

*Electrical circuit*

Figure 11:
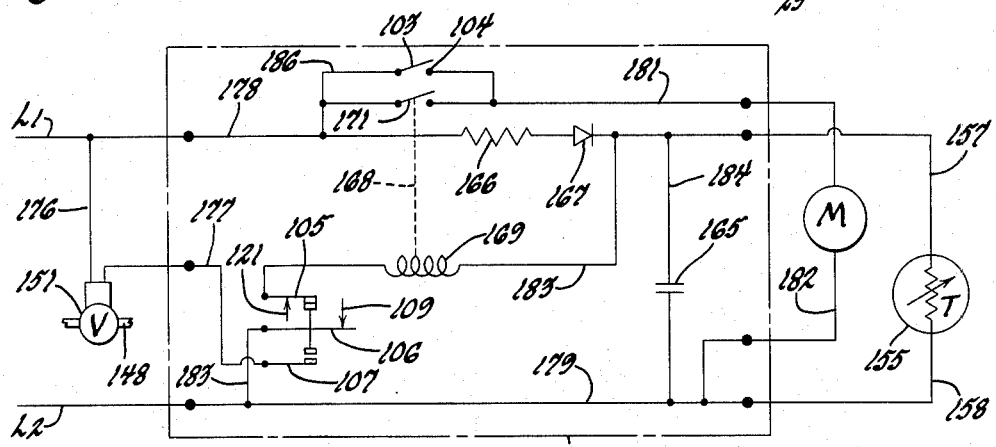
FIGURE 11 is a diagrammatic view of the electric wiring circuit for the ice making apparatus.

The electric circuit for the ice making apparatus in chamber 13 of refrigerator cabinet 10 includes a plurality of metal conductors which in referring to the diagrammatic illustration thereof in FIGURE 11 of the drawings will be described as wires. All devices of the electric system within the dot-dash lines of FIGURE 11 are on or carried by the board 100 located within housing 50 of the apparatus. For example, printed icrcuit board 100 carries a capacitor or condenser 165, a resistor 166, a diode 167 and a relay 168 (also see FIGURE 8), which contains within the body thereof an electromagnetic coil 169 and a switch 171 (see FIGURE 11). Switch spring blades or arms 103, 104, 105, 106 and 107 in FIGURE 11 are all sub-switch parts of the main stack switch 101 shown in FIGURE 8 of the drawings. One end of the magnetic coil of solenoid water valve 151 is connetced by a wire 176 to power line $L_1$ and its other end is connected by a wire 177 to spring arm 107 of switch 101. Line $L_1$ is connected by a wire 178 through resistor 166 and diode 167 to wire 157 of thermistor 155. A wire 179 connects power line $L_2$ to wire 158 of thermistor 155. A branch wire 181 leading from wire 178 through the switch 171 of relay 168 is connected to one side of the stator winding 52 of the unidirectional motor and the other side of the motor stator is connected to the other side thereof by a branch wire 182 and wire 179 to the power line $L_2$. The coil 169 of relay 168 is connected by a branch wire 183, through the electric cricuit activating contacts on spring arms 105 and 106 of switch 101, in parallel circuit relationship with the thermistor 155 intermediate condenser or capacitor 165 and the diode 167. Electromagnetic coil 169 of relay 168 is in series with one portion of the two-portion electric circuit and the unidirectional motor is interposed in another portion thereof. A branch wire 184 connects the condenser or capacitor 165 in parallel circuit relationship with lines $L_1$ and $L_2$, wires 178 and 179, intermediate relay 168 and the thermistor 155. The switch spring arms 103 and 104 of stack switch 101 are connected in parallel relationship with switch 171, contained in and actuated by coil 169 or relay 168, by a branch wire 186 attached at both of its ends to wire 181. Pin 109, which is shifted by rotation of disk 89 for closing contacts on spring arms 106 and 107 of switch 101 to energize the solenoid of water valve 151, and lever 121, which is swung about its pivotal mounting by movements of the ice storage receptacle 115, are both shown in the diagram of FIGURE 11 as arrows designated by their respective numerals. The electric circuit comprises two portions one of which includes wire 178, resistor 166, diode 167, wire 157, thermistor 155, wires 158, 179, 183, closed contacts 105 and 106 of switch 101 and coil 169 of relay 168 while the other portion of the two-portion circuit includes relay switch 171 and wires 181 and 182 having the motor interposed therebetween. The position of sub-switches or spring arms of switch 101, lever 121 and pin 109 illustrated in FIGURE 11 correspond to the position thereof shown in FIGURE 8 of the drawings and represent the electric circuit of the ice making apparatus as being activated for a water freezing, ice ejecting cycle.

*Apparatus operation*

In describing the operation of our apparatus and particularly movements of sub-switches of stack switch 101 formed by the switch spring arms or blades and contacts thereon we refer to the plurality of sub-switches by double numerals for the sake of clarity and in order to simplify the present description. Assume that compartments 31 of upright rotatable tray 25 have been substantially filled with water to be frozen into ice blocks therein within chamber 13 of cabinet 10 and that removable ice block storage receptacle 115 is located beneath the tray supported in a slightly inclined position with one side thereof resting on the flange support 127 and its other side resting on the upwardly bowed spring 134 as shown in FIGURES 1 to 6 of the drawings. The shifting of receptacle 115 into position below tray 25 has cammed or moved end 124 of rod 116, from the dot-dash line position thereof as shown in FIGURE 5, into the full line position shown therein and in FIGURES 3, 4 and 8. This rotates rod 116 about its pivotal mounting in housing 50 and shifts end 122 of lever 121 into a position immediately below the extension 123 on switch arm 105 of switch 101 (see FIGURE 8) to ready the ice making apparatus cutoff mechanism to be actuated by a subsequent movement of the ice receptacle. Water filled tray 25 is cooled to a below 32° F. temperature by chilled air circulated into chamber 13 thereover and therearound to freeze the water into ice blocks in the tray. All sub-switch parts of switch 101 are at this time in the position shown in FIGURE 8 of the drawings with the contacts on spring arms 105 and 106 closed activating the one portion of the electric circuit leading to thermistor 155 and relay 168. Electric current is now simultaneously directed from power line $L_1$ by wire 178 through resistor 166, diode 167, wire 157 to the thermistor 155 and branch wires 183 and 184 through coil 169 of the relay 168 and condenser or capacitor 165, respectively, back to power line $L_2$ by way of wire 179. As hereinbefore mentioned, the characteristics of thermistor 155 are such that its resistance to flow of electric current therethrough is decreased in response to increases in temperature and its temperature now corresponds to the temperature of water received in tray 25. The flow of electric current through thermistor 155 at this time is substantially equal to or balances the flow thereof through coil 169 of relay 168 and therefore insufficient current flows through the electromagnetic coil 169 to cause the relay to close switch 171 contained therein. Stator 52 of the unidirectional electric motor does not at this time receive current, by way of the wires 181, 186 and 182, and is consequently not as yet energized. Freezing of water in tray 25 continues until the water in compartment 31, with which thermistor 155 is associated, freezes solid. The temperature of thermistor 155 continues to be reduced while water is freezing in tray 25 and its resistance to flow of electric current therethrough gradually increases. The thermistor then senses the lowered temperature of a solidly frozen ice block in compartment 31 and its current flow resistance is increased high enough to cause unbalancing same with respect to relay 168 whereupon sufficiently more electric current flows through coil 169 of the relay for electromagnetically closing switch 171 thereof. Closing of relay switch 171 directs electric current from power line $L_1$ to the other portion of the electric circuit by way of wire 178, switch 171, wire 181 through stator 52 of the motor and back to the power line $L_2$ by way of wires 182 and 179 to now energize the unidirectional motor and cause 360° revolutions of its rotor 53. Revolutions of this rotor drive the gears 54, 56, 59, 62 and 64, through the train of reduction gears within housing 50, to also rotate wheel-like member 67 about shaft 68. Rotation of member 67 and the cam groove or race 73 therein or thereon simultaneously drives cam follower 83 and rotates disk 89 keyed to the member 67. The driving of cam follower 83 within race 73 reciprocates gear segment 75 which reciprocations are correlated or synchronized with rotation of shoulders 91, 92 and 93 on switch cam disk 89 for actuating sub-switches of switch 101 in timed sequence. At the start of operation of the unidirectional motor and rotation of shaft 68, undercut or flattened part 97 on disk 89 is rotated, in a counterclockwise direction as viewed in FIGURE 8, past spring arm 102 on switch 101 to depress same and this forces pin 109, secured to arm 103, downwardly a short distance to move the contact on arm 103 into engagement with the contact on switch arm 104 thus closing this sub-switch which is connected in parallel relation with relay switch 171. Closing of sub-switch 103–104 effects a bypass of switch 171 when this switch is opened by relay coil 169 upon shifting switch arm 106 to open the circuit to coil 169 and close the circuit to solenoid valve 151. Closing of sub-switch 103–104 causes flow of electric current from power line $L_1$ through wires 178, 186 and 181 to the motor until disk 89 makes substantially a complete revolution to reset the end of spring arm 102 into the flattened part 97 of the disk. During this time both cam race 73 on member 67 and disk 89 have been rotated approximately 180° with peripheral edge 94 on the disk 89 bearing against spring arm 102 to maintain sub-switch 103–104 closed and with the cam follower reciprocating gear segment 75 in response to the shape of race 73. The cam or motion converting means 67, 73 and 83 initially elevates gear segment 75, as viewed in FIGURE 7, to rotate tray driving gear 79 a short distance in a clockwise direction for rotating the driven end of tray 25 in a first direction, throughout an arc of approximately 30°, while the other or rear end of the tray is impinged against abutment 44 (see FIGURE 12). This rotation of tray 25 in a first direction imparts a slight twist thereto along its longitudinal length and loosens or frees ice blocks in the tray from walls of their compartments 31. The cam or motion converting means then moves the gear segment 75 downwardly to rotate driving gear 79 in a counterclockwise direction, as viewed in FIGURE 7, for rotating tray 25 in a second direction, approximately 90° from its normal horizontal position (see FIGURE 13), away from abutment 44 into engagement with stop stud 46 to substantially invert the tray whereupon the ice blocks loosened by the initial twist thereof are ejected therefrom and fall into the ice block storage receptacle 115. Continued rotation of gear 79 in a counterclockwise direction, as viewed in FIGURE 7, further rotates the driven end of tray 25 in its second direction, while the other or rear end thereof engages stop stud 46 (see FIGURE 13), 30° past this stop to reversely twist the tray along its longitudinal length. Counterclockwise rotation of the rear end of tray 25 is limited, by stop 46, to an arc of 90° but the total counterclockwise rotary movement of its forward or driven end, inclusive of the 30° clockwise rotation and the 30° counterclockwise rotation thereof past stud 46, as illustrated in FIGURE 13 of the drawings, is throughout an arc of 150° so as to impart to the tray a reverse twist in an amount at least equal to its 30° initial twist. This reverse twisting of tray 25 is highly desirable to remove warpage therefrom, as occasioned by its initial twist, before the tray is rotated into its upright position. The initial rotation and twist of tray 25, ejection of ice blocks therefrom, the reverse rotation and twisting thereof and its return movement, in an unwarped state, to an upright position with the other or rear end thereof reimpinged against abutment stud 44, as shown in FIGURES 2, 3, 4 and 6 of the drawings, all occur during approximately a 180° rotary movement of cam wheel 67. The radius of cam race 73 on cam wheel 67 is uniform throughout substantially the remainder of a 180° arc in one complete revolution thereof and this part of its revolution is utilized to permit certain functions of elements of the electric circuit for the ice making apparatus to be carried out as will be described hereinafter. It is to be here understood that while tray 25 is being twisted, a certain amount of lengthwise shrinkage or so-called "roping" thereof takes place and therefore cleats 33 on the tray are slidably mounted on the studs or shafts 37 and 43 for longitudinal sliding movement therealong to permit such tray shrinkage.

During the opposite rotations and twisting movements of tray 25, disk 89 also makes one complete 360° revolution with switch 103–104 closed except at the start and finish of rotating the tray by virtue of peripheral edge portions of the disk deflecting arm 102 on switch 101 to force pin 109 to move the contact on spring arm 103 into engagement with the contact on arm 104. While disk 89 rotates throughout a second arc of approximately 180° or the remainder of one of its 360° rotations, tray 25 has been rerotated into its normal upright position and water valve sub-switch 106–107 has both closed and opened to refill the tray with water. This function is a result of shoulder 91 on disk 89 being rotated past spring arm 102 which causes the greater diametered peripheral edge 96 on the disk to depress pin 109 a further distance downward, as viewed in FIGURE 8, whereby the pin engages and shifts the contact on spring arm 106 out of engagement with the contact on spring arm 105 into engagement with the contact on spring arm 107. Opening of sub-switch 105–106 and closing of sub-switch 106–107 de-energizes relay 168 whereupon the switch 171 in the relay opens, while sub-switch 103–104 is closed, and energizes the solenoid of valve 151 respectively to open the valve. The now closed sub-switch 103–104 providing the bypass around relay switch 171, as previously described, is thus necessary at this time to keep the motor energized for completing the cycle of operation. Valve 151 remains open until shoulder 92 on disk 89 rotates past spring arm 102 to substantially fill the tray 25 with water. As shoulder 92 on disk 89 passes spring arm 102 this arm shifts into abutment with peripheral edge portion 94 of the disk between shoulders 92 and 93 thereon. This shifting of arm 102 permits pin 109 to move upwardly out of engagement with spring arm 106 and since arm 102 is in abutment with the edge 94 of disk 89 pin 109 still maintains sub-switch 103–104 closed. The upward movement of pin 109 out of engagement with spring arm 106 causes this arm to shift thus opening sub-switch 106-107 and closing sub-switch 105–106 to de-energize valve 151 and for reconnecting the electric circuit of thermistor 155 and relay 168. Thermistor 155 has by this time been warmed in response to the temperature of water discharged into tray 25 and its resistance to flow of electric current therethrough is decreased thus readying the control of the electric circuit for another water freezing ice block ejecting cycle before sub-switch 103–104 of the circuit is opened. Sub-switch 103–104 now still being closed and operating the motor to continue rotation of disk 89, in a counterclockwise direction as viewed in FIGURE 8, for one complete 360° rotation thereof causes shoulder 93 on the disk to engage and ride past spring arm 102. Shoulder 93 depresses arm 102 and again deflects pin 109 downward to momentarily repeat the opening of sub-switch 105–106 and closing of sub-switch 106–107 in advance of arm 102 entering recessed or cut-out flat part 97 of disk 89. The momentary repeat closing of sub-switch 106–107 energizes valve 151 to open same and deliver a final predetermined amount of water to tray 25 before spring arm 102 enters part 97 of disk 89. As shoulder 93 rides past arm 102 this arm springs against the flat part 97 of rotating disk 89 with pin 109 following the arm 102 under influence of spring arm 103 to open sub-switch 103–104 for breaking the electric circuit to the unidirectional motor and stopping its operation. This prepares the ice making apparatus for another or subsequent water freezing ice block ejecting cycle.

*Apparatus cut-off means*

As hereinbefore mentioned, it is desired to stop production of ice blocks by the ice making apparatus upon accumulation of a predetermined number of ice blocks in the removable ice storage receptacle 15, as this receptacle is moved from beneath tray 25 and/or when same is removed from freezing chamber 13 of the refrigerator cabinet, in order that ice blocks will not overflow receptacle 115 and be ejected at random into the freezing chamber. Receptacle 115 is therefore constructed to cooperate with rod 116 in a manner to accomplish this desideration. For example and as has been described, the angularly bent end 124 of rod 116 is normally in the position shown by full lines in FIGURE 5 of the drawings compressing hairpin-like spring 142 and held away from stop stud 141 by the angled and inclined shoulder 131 on the top 129 of the handle portion of receptacle 115 at the front thereof. Several successive water freezing ice block ejecting cycles of the ice making apparatus will produce an accumulation of ice blocks in receptacle 115 and the weight of the accumulated ice then causes one long side of the receptacle to compress spring 134 and tilt this one side of the receptacle downwardly. Tilting movement of receptacle 115 lowers the top surface 129 thereon and the angled end portion 124 of rod 116 is slipped, under the influence of spring 142, over the shoulder 131 to swing the rod against stop 141 as illustrated by the dot-dash lines in FIGURE 5 into the position above the lowered surface 129 of the downwardly shifted receptacle as shown in FIGURE 10. The spring 142 rotates the pivotally mounted portion of bar 116 and overcomes the spring tension of arm 105 of switch 101 and lifts the contact thereon upwardly away from the contact on switch arm 106 to open the sub-switch formed by these elements. Opening of sub-switch 105–106 deactivates the electric circuit of the ice making apparatus, particularly relay 168 and thermistor 155, and terminates operation of the apparatus so that no more ice blocks can be ejected from tray 25.

It is to be noted that the shifting of rod 116 to deactivate the electric circuit of the ice making apparatus and terminate ejection of ice blocks therefrom in the manner just described can also be and is preferably carried out in a different fashion. The cooperation of receptacle 115 with rod 116 as herein disclosed supplies a two-fold purpose thereof in the present apparatus. Rod 116 will be shifted as described in response to moving the receptacle outwardly away from same and/or will be shifted in response to removal of the receptacle from chamber 13 of cabinet 10 in serving ice blocks from the receptacle at a point remote from the refrigerator. For example, any movement of receptacle 115 out of cooperation with the cut-off portion of the apparatus will cause the spring 142 to shift rod 116 against the stop 141 for actuating lever 121 associated with stack switch 101 to open the sub-switch 105–106 thereof and temporarily interrupt flow of electric current to the relay 168 thereby stopping production of ice blocks by the ice making apparatus.

While the embodiments of the present invention as herein disclosed constitute preferred forms, it is to be understood that other forms might be adopted.

What is claimed is as follows:

1. An automatic liquid freezer including a mold having means for holding liquid, means for freezing liquid in said mold, means associated with said mold for discharging frozen liquid from said mold, a collecting bin removably mounted below said mold, fixed immovable means normally in contact with said bin for slidably supporting said bin, resilient means between said collecting bin and said fixed supporting means for resiliently supporting said collecting bin relative to said supporting means, a feeler member normally biased into contact with said collecting bin for measuring the movement of said bin relative to said fixed means, and control means responsive to the movement of said feeler relative to said support for controlling said means for discharging frozen liquid from said mold.

2. An automatic liquid freezer including a mold means for holding liquid, means for freezing liquid in said mold, means associated with said mold for discharging frozen liquid from said mold, a collecting bin removably mounted below said mold for receiving frozen liquid discharged from said mold, means for removably supporting said bin, downwardly deflecting resilient means between said collecting bin and said supporting means for resiliently supporting said bin relative to said supporting means for downward deflection of said bin in response to the mass of frozen liquid collected therein, a feeler member, means for normally biasing said feeler member downwardly into contact with said bin, and control means responsive to the downward movement of said feeler member for stopping said means for discharging frozen liquid from said mold.

3. An automatic liquid freezer including a mold having means for holding liquid, means for supplying liquid to said mold, means for freezing liquid in said mold, means for discharging frozen liquid from said mold, a substantially rigid slideway, a removable bin slidably supported by said slideway for collecting the discharged frozen liquid from said mold, resilient support means between said bin and said slideway, means for operating said liquid supply means and said discharging means, and means responsive to the presence of said bin in said slideway for rendering effective said operating means and responsive to the deflection of said bin relative to said slideway for stopping the operation of said operating means.

4. An automatic liquid freezer including a mold having means for holding liquid, means for supplying liquid to said mold, means for freezing liquid in said mold, means associated with said mold for discharging frozen liquid from said mold, means for operating said liquid supply means and said discharging means, a collecting bin removably mounted below said mold for receiving frozen liquid discharged from said mold, means for normally and removably supporting said bin, downwardly deflecting resilient means between said collecting bin and said supporting means for resiliently supporting said bin relative to said supporting means for downward deflection of said bin in response to a predetermined mass collected therein, a feeler member arranged for biased downward movement into contact with said bin in its normally supported position, and control means for said operating means responsive to the downward movement of said feeler member for stopping said operating means whenever said collecting bin is sufficiently weighted to indicate a full supply of frozen liquid or is removed.

5. An automatically operated liquid freezer comprising:
 (a) a liquid receiving receptacle,
 (b) a control means for said liquid freezer adapted to create liquid freezing and frozen liquid ice ejecting cycles thereof for delivering frozen liquid therefrom into said receptacle,
 (c) a support means for suspendingly supporting said receptacle in slidable association with said liquid freezer and for weighted movement relative to said support means,
 (d) a pivoted lever cooperating with said control means and having engagement with a part of said receptacle for rendering the control means effective and ineffective, and
 (e) said lever being swingable and having a portion extending into the path of the normal movement of said receptacle upon said support for actuating said control means both in response to sliding said receptacle along said support means and to movement of the receptacle with respect thereto under the weight of a predetermined accumulation of frozen liquid in said receptacle for terminating a frozen liquid ejecting cycle of the liquid freezer.

6. A liquid freezer comprising in combination:
 (a) a mold for receiving liquid to be frozen into blocks,
 (b) a receptacle adapted to receive frozen blocks from said mold,
 (c) a stationary support means for supporting said receptacle in association with said mold for sliding movement relative to the support means and additional means providing for movement of the receptacle in another direction with respect to said support means,
 (d) a control means for creating mold liquid filling and liquid freezing cycles and frozen liquid ejecting cycles of said freezer,
 (e) said control means including an actuator protruding therefrom normally engaging said receptacle to render the control means effective for causing said cycles of the freezer.

References Cited by the Examiner
UNITED STATES PATENTS

| | | | |
|---|---|---|---|
| 2,771,749 | 11/1956 | Miller. | |
| 2,994,205 | 8/1961 | Brubaker et al. | 62—137 X |
| 3,046,754 | 7/1962 | Kniffin | 62—135 |
| 3,163,019 | 12/1964 | Hall | 62—137 |

ROBERT A. O'LEARY, *Primary Examiner.*